United States Patent
Kito et al.

(10) Patent No.: US 11,491,776 B2
(45) Date of Patent: Nov. 8, 2022

(54) COMPOSITION FOR MODEL MATERIALS, OPTICALLY SHAPED ARTICLE, AND METHOD FOR PRODUCING OPTICALLY SHAPED ARTICLES

(71) Applicants: MAXELL, LTD., Kyoto (JP); MIMAKI ENGINEERING CO., LTD., Nagano (JP)

(72) Inventors: Katsuyuki Kito, Osaka (JP); Taeko Izumo, Osaka (JP); Masakatsu Okawa, Nagano (JP); Kenta Hongo, Nagano (JP)

(73) Assignees: MAXELL, LTD., Kyoto (JP); MIMAKI ENGINEERING CO., LTD., Nagano (JP)

( * ) Notice: Subject to any disclaimer, the term of this patent is extended or adjusted under 35 U.S.C. 154(b) by 815 days.

(21) Appl. No.: 16/084,190

(22) PCT Filed: Feb. 28, 2017

(86) PCT No.: PCT/JP2017/007969
§ 371 (c)(1),
(2) Date: Sep. 11, 2018

(87) PCT Pub. No.: WO2017/159358
PCT Pub. Date: Sep. 21, 2017

(65) Prior Publication Data
US 2020/0291161 A1     Sep. 17, 2020

(30) Foreign Application Priority Data
Mar. 14, 2016   (JP) .............................. JP2016-049535

(51) Int. Cl.
*B33Y 10/00*    (2015.01)
*B33Y 70/00*    (2020.01)
(Continued)

(52) U.S. Cl.
CPC ............... *B33Y 10/00* (2014.12); *B33Y 70/00* (2014.12); *C08F 220/281* (2020.02);
(Continued)

(58) Field of Classification Search
CPC ............... B29K 2033/04; B29C 64/118; C08F 290/067; C08F 220/305; B33Y 70/00; B33Y 10/00
See application file for complete search history.

(56) References Cited

U.S. PATENT DOCUMENTS

2011/0028586 A1*   2/2011   Kito .................... C09D 11/101
                                                  522/63
2013/0234370 A1    9/2013   Suzuki et al.

FOREIGN PATENT DOCUMENTS

EP    2 277 956 A1    1/2011
EP    2 636 511 A1    9/2013
(Continued)

OTHER PUBLICATIONS

Chinese Office Action issued in corresponding Chinese Patent Application No. 201780016352.8, dated Nov. 25, 2020, with English translation.
(Continued)

*Primary Examiner* — Larry W Thrower
(74) *Attorney, Agent, or Firm* — McDermott Will & Emery LLP

(57) ABSTRACT

A composition for model materials (4a) is used for shaping an optically shaped article by an inkjet optical shaping method, comprises a monofunctional monomer (A) and an oligomer (B) as a photocurable component, further, comprises no polyfunctional monomer (C) as a photocurable component, or comprises a polyfunctional monomer (C) as a photocurable component at 3.0 parts by weight based on 100 parts by weight of a whole composition for model
(Continued)

materials, the oligomer (B) has a hydroxyl group or an amino group, and a total molar fraction of the hydroxyl group and the amino group in a total amount of the photocurable components is less than 5.0%. The composition for model materials (4a) can afford an optically shaped article that has flexibility, and does not crack even when it is bent.

10 Claims, 1 Drawing Sheet

(51) Int. Cl.
 C08F 220/28 (2006.01)
 C08F 220/30 (2006.01)
 C08F 290/06 (2006.01)
 B29C 64/118 (2017.01)
 B29K 33/04 (2006.01)

(52) U.S. Cl.
 CPC ...... *C08F 220/286* (2020.02); *C08F 220/301* (2020.02); *C08F 220/305* (2020.02); *C08F 290/067* (2013.01); *B29C 64/118* (2017.08); *B29K 2033/04* (2013.01)

(56) References Cited

FOREIGN PATENT DOCUMENTS

| JP | 2012-111226 A | 6/2012 |
| JP | 2015-078255 A | 4/2015 |
| WO | 2015/049873 A1 | 4/2015 |

OTHER PUBLICATIONS

Chinese Office Action issued in corresponding Chinese Patent Application No. 201780016352.8, dated Mar. 2, 2020, with English translation.
Extended European Search Report issued in corresponding European Patent Application No. 17766361.4-1107, dated Sep. 20, 2019.
International Search Report issued in corresponding International Patent Application No. PCT/JP2017/007969, dated May 9, 2017, with English Translation.
International Preliminary Rpeort on Patentability dated Sep. 18, 2018, issued in International Patent Application No. PCT/JP2017/007969, with English Translation.

* cited by examiner

COMPOSITION FOR MODEL MATERIALS, OPTICALLY SHAPED ARTICLE, AND METHOD FOR PRODUCING OPTICALLY SHAPED ARTICLES

CROSS REFERENCE

This application is the U.S. National Phase under 35 U.S.C. § 371 of International Application No. PCT/JP2017/007969, filed on Feb. 28, 2017, which claims the benefit of Japanese Application No. 2016-049535, filed on Mar. 14, 2016, the entire contents of each are hereby incorporated by reference.

TECHNICAL FIELD

The present invention relates to a composition for model materials, which is used for shaping model materials by an inkjet optical shaping method, an optically shaped article that was shaped using the composition for model materials, and a method for producing an optically shaped article that is shaped using the composition for model materials.

BACKGROUND ART

Conventionally, as a method for making a stereoscopically shaped article, a shaping method using a photocurable composition that is cured by irradiating ultraviolet rays or the like has been widely known. Specifically, in such a shaping method, by irradiating a photocurable composition with ultraviolet ray or the like to cure it, a cured layer having a predetermined shape is formed. Thereafter, a new cured layer is formed by further feeding a photocurable composition on the cured layer to cure it. By repeatedly performing the above step, a stereoscopically shaped article is prepared.

Among the shaping methods, in recent years, an optical shaping method by an inkjet system of discharging a photocurable composition from a nozzle, and irradiating ultraviolet rays or the like immediately after that to cure it, thereby, forming a cured layer having a predetermined shape (hereinafter, referred to as inkjet optical shaping method) has been reported (Patent Document 1). The inkjet optical shaping method does not need installation of a large resin liquid tank for storing a photocurable composition and a darkroom. For that reason, as compared with the conventional method, a shaping apparatus can be miniaturized. The inkjet optical shaping method is paid attention, as a shaping method that is achieved with a 3D printer capable of freely making a stereoscopically shaped article, based on Computer Aided Design (CAD) data.

Recently, development of a photocurable composition by which an optically shaped article that is soft like rubber can be prepared, using the inkjet optical shaping method is being advanced. For example, Patent Document 2 discloses a photocurable composition containing a monofunctional monomer and a polyfunctional monomer, in which at least one of the monofunctional monomer or the polyfunctional monomer has a hydroxyl group or an amino group, and a total molar fraction of the hydroxyl group and the amino group in a total amount of the monofunctional monomer and the polyfunctional monomer is 5 to 30%. By curing the photocurable composition, an optically shaped article having elongation and elasticity like rubber can be prepared.

PRIOR ART DOCUMENTS

Patent Documents

Patent Document 1: JP-A-2012-111226
Patent Document 2: International Publication WO 2015/049873

SUMMARY OF THE INVENTION

Problems to be Solved by the Invention

However, the optically shaped article having flexibility like rubber, which is shaped using the conventional photocurable composition has a problem that the article cracks when it is bent to some extent.

The present invention was made in view of the above-mentioned present situation, and an object thereof is to provide a composition for model materials, for obtaining an optically shaped article that has flexibility, and does not crack even when it is bent, an optically shaped article that was shaped using the composition for model materials, and a method for producing an optically shaped article that are shaped using the composition for model materials.

Solutions to the Problems

The present inventors variously made studies on the above-mentioned problem, and found out that when in a composition for model materials containing a monofunctional monomer and an oligomer, a total molar fraction of a hydroxyl group and an amino group possessed by the oligomer is in a predetermined range, and in the case where a polyfunctional monomer is contained, the content thereof is in a predetermined range, an optically shaped article that is obtained by photocuring the composition for model materials has flexibility, and does not crack even when it is bent.

The present invention was made based on the above-mentioned finding, and the gist thereof is as follows:

[1] A composition for model materials, which is used for shaping an optically shaped article by an inkjet optical shaping method, comprising a monofunctional monomer (A) and an oligomer (B) as a photocurable component, further, comprising no polyfunctional monomer (C) as a photocurable component, or comprising a polyfunctional monomer (C) as a photocurable component at 3.0 parts by weight or less based on 100 parts by mass of a whole composition for model materials, wherein the oligomer (B) has a hydroxyl group or an amino group, and a total molar fraction of the hydroxyl group and the amino group in a total amount of the photocurable component is less than 5.0%.

The composition for model materials contains a monofunctional monomer (A) and, further, an oligomer (B). The oligomer (B) is a component that raises the elongation rate of a cured product, and improves flexibility of a cured product. For that reason, an optically shaped article which is obtained by photocuring the composition for model materials has flexibility, and becomes difficult to crack even when it is bent.

Additionally, an optically shaped article which is obtained by photocuring the composition for model materials is excellent in the rebound resilience.

Since an optically shaped article which is obtained by photocuring the conventional composition for model materials has the large content of a monomer component, it had a problem that the surface tackiness increases when one tried to enhance flexibility. However, since the composition for model materials described in [1] contains an oligomer (B) excellent in the reactivity and the curability, the surface tackiness of an optically shaped article obtained by photocuring the composition for model materials can be suppressed.

In the composition for model materials, the oligomer (B) has a hydroxyl group or an amino group, and a total molar fraction of the hydroxyl group and the amino group in a total amount of the photocurable component is less than 5.0%. For that reason, an optically shaped article obtained by photocuring the composition for model materials has flexibility, and becomes difficult to crack even when it is bent. When the molar fraction is 5.0% or more, since the cohesive force between the oligomers (B) becomes higher, when an optically shaped article obtained by photocuring the composition for model materials is bent, a crack becomes easy to be generated at a bent part to which the stress is locally applied.

The composition for model materials contain no polyfunctional monomer (C), or contains a polyfunctional monomer (C) at 3.0 parts by weight or less based on 100 parts by weight of the whole composition for model materials. For that reason, an optically shaped article obtained by photocuring the composition for model materials can suppress the surface tackiness. On the other hand, when the composition contains the polyfunctional monomer (C) at an amount exceeding 3.0 parts by weight, since three-dimensional crosslinking is increased, an optically shaped article obtained by photocuring the composition for model materials loses flexibility. As a result, the optically shaped article becomes easy to crack when it is bent.

[2] The composition for model materials according to [1], wherein the oligomer (B) is one or more selected from a urethane (meth)acrylate oligomer, an epoxy (meth)acrylate oligomer, and a polyester (meth)acrylate oligomer.

When the oligomer (B) is one or more selected from a urethane (meth)acrylate oligomer, an epoxy (meth)acrylate oligomer, and a polyester (meth)acrylate oligomer, an optically shaped article obtained by photocuring the composition for model materials becomes more difficult to crack when it is bent.

[3] The composition for model materials according to [1] or [2], wherein a content of the monofunctional monomer (A) is 60.0 to 95.0 parts by weight based on 100 parts by weight of the whole composition for model materials.

The oligomer (B) has a high viscosity. For that reason, the viscosity of the composition for model materials containing the oligomer (B) becomes high. However, when the composition contains the monofunctional monomer (A) at 60.0 to 95.0 parts by weight based on 100 parts by weight of the whole composition for model materials, the viscosity of the composition for model materials can be maintained low.

[4] The composition for model materials according to any one of [1] to [3], wherein a content of the oligomer (B) is 5 to 30 parts by weight based on 100 parts by weight of the whole composition for model materials.

As described above, the viscosity of the composition for model materials containing the oligomer (B) becomes high. However, when the content of the oligomer (B) is 5 to 30 parts by weight based on 100 parts by weight of the whole composition for model materials, the viscosity of the composition for model materials can be maintained low, and when an optically shaped article is bent, it becomes more difficult to crack.

[5] An optically shaped article which is shaped by using the composition for model materials as defined in any one of [1] to [4] by an inkjet optical shaping method.

An optically shaped article which is shaped by using the composition for model materials as defined in any one of [1] to [4] is difficult to crack even when it is bent.

[6] A method for producing an optically shaped article by an inkjet optical shaping method, comprising a step (I) of photocuring the composition for model materials as defined in any one of [1] to [4] to obtain a model material, and at the same time, photocuring a composition for support materials to obtain a support material, and a step (II) of removing the support material.

By using the composition for model materials as defined in any one of (1) to (4), an optically shaped article that is difficult to crack even when it is bent can be suitably produced.

Effects of the Invention

According to the present invention, there can be provided a composition for model materials for obtaining an optically shaped article that has flexibility, and does not crack even when it is bent, an optically shaped article which is shaped by using the composition for model materials, and a method for producing an optically shaped article which are shaped by using the composition for model materials.

EMBODIMENTS OF THE INVENTION

Figure 1:
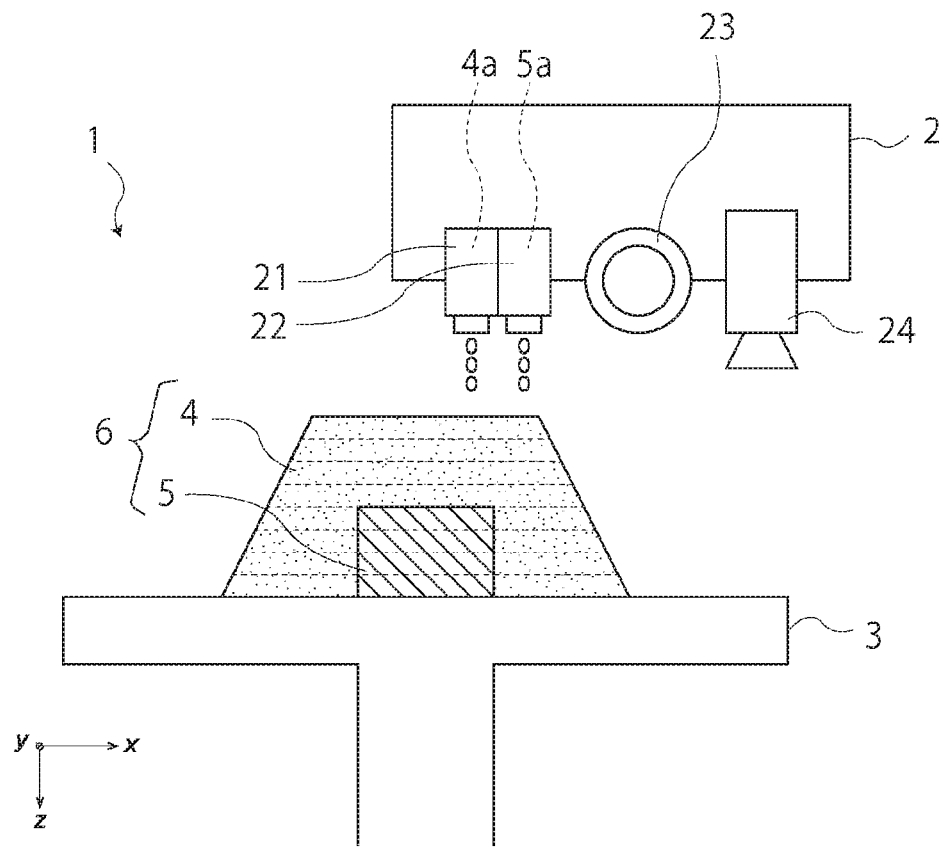
FIG. 1 is a view schematically showing a step [I] in a method for producing an optically shaped article according to the present embodiment.

One embodiment of the present invention (hereinafter, also referred to as present embodiment) will be illustrated in detail below. The present invention is not limited to the following content. In addition, in the present invention, "(meth)acrylate" is a generic name of acrylate and methacrylate, and means one or both of acrylate and methacrylate. This also applies to "(meth)acryloyl" and "(meth)acryl".

1. Composition for Model Materials

A composition for model materials according to the present embodiment is used for shaping an optically shaped article by an inkjet optical shaping method. The composition contains a monofunctional monomer (A) and an oligomer (B) as an photocurable component, and further, contains no polyfunctional monomer (C) as a photocurable component, or contains a polyfunctional monomer (C) as a photocurable component at 3.0 parts by weight or less based on 100 parts by weight of the whole composition for model materials, the oligomer (B) has a hydroxyl group or an amino group, and a total molar fraction of the hydroxyl group and the amino group in a total amount of the photocurable components is less than 5.0%.

<Monofunctional Monomer (A)>

A monofunctional monomer (A) is a photocurable component having such property that it is cured with an energy ray, and is necessarily contained in the composition for model materials. Examples of the monofunctional monomer (A) include linear or branched alkyl (meth)acrylates having 4 to 30 carbon atoms [e.g. methyl (meth)acrylate, ethyl (meth)acrylate, isobutyl (meth)acrylate, lauryl (meth)acrylate, stearyl (meth)acrylate, isostearyl (meth)acrylate, t-butyl (meth)acrylate etc.], alicyclic or aromatic ring-containing (meth)acrylates having 6 to 20 carbon atoms [e.g. cyclohexyl (meth)acrylate, 4-t-cyclohexyl (meth)acrylate, isobornyl (meth)acrylate, phenoxyethyl (meth)acrylate, dicyclopentanyl (meth)acrylate etc.], heterocyclic ring-containing (meth)acrylates having 5 to 20 carbon atoms [e.g. tetrahydrofurfuryl (meth)acrylate, 4-(meth)acryloyloxymethyl-2-methyl-2-ethyl-1,3-dioxolane, 4-(meth)acryloyloxymethyl-2-cyclohexyl-1,3-dioxolane, adamantyl (meth)acrylate etc.] and the like. These may be used alone, or two or more of them may be used in combination. From a viewpoint that the composition for model materials is maintained at a low viscosity, and the curability of an optically shaped article is improved, among these, isobornyl (meth)acrylate, or ethoxyethoxyethyl (meth)acrylate is preferable.

It is preferable that the content of the monofunctional monomer (A) is 60.0 to 95.0 parts by weight based on 100 parts by weight of the whole composition for model materials. When the content of the monofunctional monomer (A) is less than 60.0 parts by mass, the viscosity of the composition for model materials cannot be maintained low in some cases. On the other hand, when the content of the monofunctional monomer (A) exceeds 95.0 parts by weight, the elasticity of an optically shaped article may be inferior, and the surface tackiness cannot be suppressed in some cases. The content of the monofunctional monomer (A) is more preferably 70.0 parts by weight or more, and more preferably 90.0 parts by weight or less. In addition, when two or more of the (A) components are contained, the content is a total of the contents of respective (A) components.

<Oligomer (B)>

An oligomer (B) is a photocurable component having such property that it is cured with an energy ray, and is necessarily contained in the composition for model materials. The oligomer (B) has a hydroxyl group or an amino group. In addition, the hydroxyl group includes not only an alcoholic hydroxyl group, but also a carboxyl group and the like. Additionally, the amino group includes not only a normal amino group, but also an amide bond, a urea bond, a urethane bond, and the like.

Examples of the oligomer (B) having a hydroxyl group and/or an amino group include an epoxy (meth)acrylate oligomer, a polyester (meth)acrylate oligomer, a urethane (meth)acrylate oligomer, and the like. These may be used alone, or two or more of them may be used in combination. From a viewpoint that there is a wide range of material selection, and materials having various properties can be selected, among these, a urethane (meth)acrylate oligomer is preferable.

It is preferable that the content of the oligomer (B) is 5 to 30 parts by weight based on 100 parts by weight of the whole composition for model materials. When the content of the oligomer (B) is less than 5 parts by weight, flexibility of an optically shaped article may be inferior, and the surface tackiness cannot be suppressed in some cases. On the other hand, when the content of the oligomer (B) exceeds 30 parts by weight, the composition for model materials cannot be maintained at the low viscosity in some cases. The content of the oligomer (B) is more preferably 10 parts by weight or more, and more preferably 26 parts by weight or less. In addition, when two or more of the (B) components are contained, the content is a total of the contents of respective (B) components.

In the oligomer (B), a total molar fraction of the hydroxyl group and the amino group in a total amount of the photocurable components is less than 5.0%. For that reason, an optically shaped article obtained by photocuring the composition for model materials becomes difficult to crack even when it is bent. The total molar fraction is preferably 4.8% or less. Additionally, from a viewpoint that the article is made to be difficult to crack even when it is bent, the total molar fraction is preferably 0.5% or more, and more preferably 1.0% or more.

In addition, in the present description, the "oligomer" refers to an oligomer having a weight average molecular weight Mw of 1,000 to 10,000. More preferably, the oligomer refers to an oligomer in which a lower limit value of a weight average molecular weight Mw exceeds 1,000. A weight average molecular weight Mw means a weight average molecular weight in terms of polystyrene, which was measured by Gel Permeation Chromatography (GPC).

<Polyfunctional Monomer (C)>

A polyfunctional monomer (C) is a photocurable component having such property that it is cured with an energy ray, and may be contained in the composition for model materials.

Examples of the polyfunctional monomer (C) include linear or branched alkylene glycol di(meth)acrylates or alkylene glycol tri(meth)acrylates having 10 to 25 carbon atoms [e.g. tripropylene glycol di(meth)acrylate, 1,6-hexanediol di(meth)acrylate, neopentyl glycol di(meth)acrylate, 1,9-nonanediol di(meth)acrylate, 3-methyl-1,5-pentanediol di(meth)acrylate, 2-n-butyl-2-ethyl-1,3-propanediol di(meth)acrylate, pentaerythritol tri(meth)acrylate etc.], alicyclic ring-containing di(meth)acrylates having 10 to 30 carbon atoms [e.g. dimethyloltricyclodecane di(meth)acrylate etc.] and the like. These may be used alone, or two or more of them may be used in combination. From a viewpoint that the composition for model materials is maintained at a low viscosity, and the curability of an optically shaped article is improved, among them, tripropylene glycol di(meth)acrylate, or 1,6-hexanediol di(meth)acrylate is preferable.

When the polyfunctional monomer (C) is contained in the composition for model materials, the content thereof is 3.0 parts by weight or less based on 100 parts by weight of the whole composition for model materials. When the content of the polyfunctional monomer (C) is 3.0 parts by weight or less, an optically shaped article obtained by photocuring the composition for model materials becomes difficult to crack even when it is bent. The content of the polyfunctional monomer (C) is preferably 2.0 parts by weight or more. When the content of the polyfunctional monomer (C) is less than 2.0 parts by weight, the surface tackiness of an optically shaped article cannot be suppressed in some cases. In addition, when two or more of the (C) components are contained, the content is a total of the contents of respective (C) components.

Another additive can be contained in the composition for model materials according to the present embodiment as necessary, in such a range that the effect of the present invention is not impaired. Examples of another additive include photopolymerization initiators, preservation stabilizers, antioxidants, coloring agents, ultraviolet absorbing agents, light stabilizers, polymerization inhibiters, chain transfer agents, fillers, and the like.

The photopolymerization initiator is not particularly limited, as long as it is a compound that promotes a radical reaction when irradiated with ultraviolet rays, near ultraviolet rays or light having a wavelength in a visible light region. Examples of the photopolymerization initiator include benzoin compounds having 14 to 18 carbon atoms [e.g. benzoin, benzoin methyl ether, benzoin ethyl ether, benzoin propyl ether, benzoin isobutyl ether etc.], acetophenone compounds having 8 to 18 carbon atoms [e.g. acetophenone, 2,2-diethoxy-2-phenylacetophenone, 2,2-diethoxy-2-phenylacetophenone, 1,1-dichloroacetophenone, 2-hydroxy-2-methyl-phenylpropane-1-one, diethoxyacetophenone, 1-hydroxycyclohexyl phenyl ketone, 2-methyl-1-[4-(methylthio)phenyl]-2-morpholinopropane-1-one etc.], anthraquinone compounds having 14 to 19 carbon atoms [e.g. 2-ethylanthraquinone, 2-t-butylanthraquinone, 2-chloroanthraquione, 2-amylanthraquinone etc.], thioxanthone compounds having 13 to 17 carbon atoms [e.g. 2,4-diethylthioxanthone, 2-isopropylthioxanthone, 2-chlorothioxanthone etc.], ketal compounds having 16 to 17 carbon atoms [e.g. acetophenonedimethylketal, benzyldimethylketal etc.], benzophenone compounds having 13 to 21 carbon atoms [e.g. benzophenone, 4-benzoyl-4'-methyldiphenyl sulfide, 4,4'-bismethylaminobenzophenone etc.], acylphosphine oxide compounds having 22 to 28 carbon atoms [e.g. 2,4,6-trimethylbenzoyl-diphenyl-phosphine oxide, bis-(2,6-dimethoxybenzoyl)-2,4,4-trimethylpentylphosphine oxide, bis(2,4,6-trimethylbenzoyl)-phenylphosphine oxide etc.], mixtures of these compounds, and the like. These may be used alone, or two or more of them may be used in combination. From a viewpoint of the light resistance that an optically shaped article obtained by photocuring the composition for model materials is difficult to yellow, among these, 2,4,6-trimethylbenzoyl-diphenyl-phosphine oxide is preferable. Additionally, examples of an available acylphosphine oxide compound include DAROCURE TPO manufactured by BASF SE, and the like.

The content of the photopolymerization initiator is 3 to 15 parts by weight based on 100 parts by weight of the whole composition for model materials. When the content of the photopolymerization initiator is less than 3 parts by weight, since an unreacted polymerization component may be increased, the curability of an optically shaped article is not sufficient in some cases. On the other hand, when the content of the photopolymerization initiator exceeds 15 parts by weight, an unreacted photopolymerization initiator may remain, and an optically shaped article yellows in some cases. In addition, when two or more of the photopolymerization initiators are contained, the content is a total of the contents of respective photopolymerization initiators.

The preservation stabilizer can enhance the preservation stability of the composition. Additionally, head clogging generated by polymerization of a polymerizable compound with a heat energy can be prevented. In order to obtain these effects, it is preferable that the content of the preservation stabilizer is 0.05 to 3.0 parts by weight based on 100 parts by weight of the whole composition for model materials.

Examples of the preservation stabilizer include hindered amine-based compounds (HALS), phenol-based antioxidants, phosphorus-based antioxidants, and the like. Specifically, examples include hydroquinone, methoquinone, benzoquinone, p-methoxyphenol, hydroquinone monomethyl ether, hydroquinone monobutyl ether, TEMPO, 4-hydroxy-TEMPO, TEMPOL, Cupferron Al, t-butylcatechol, pyrogallol, and the like. Examples of a commercial product include IRGASTAB UV-10, IRGASTAB UV-22, FIRSTCURE ST-1 (the forgoing are manufactured by ALBEMARLE Corporation), TINUVIN 111 FDL, TINUVIN 144, TINUVIN 292, TINUVIN XP40, TINUVIN XP60, TINUVIN 400 (the forgoing are manufactured by BASF SE), and the like. These may be used alone, or two or of them may be used in combination. In addition, when two or more of the preservation stabilizers are contained, the content is a total of the contents of respective preservation stabilizers.

The composition for model materials according to the present embodiment can be produced, for example, by uniformly mixing the (A) to (C) components, and as necessary, another additive using a mixing stirring device or the like, without particular limitation.

It is preferable that the thus produced composition for model materials according to the present embodiment has the viscosity at 25° C. of 100 mPa·s or less, from a viewpoint that dischargeability from an inkjet head is improved. In addition, measurement of the viscosity of the composition for model materials can be performed using a R100-type viscometer in accordance with JIS Z 8803.

2. Composition for Support Materials

In an inkjet optical shaping method, when an optically shaped article having a complicated shape such as a hollow shape is shaped, an optically shaped article may be shaped by combining the model material and a support material in order to support the model material obtained by photocuring the composition for model materials according to the present embodiment. The support material is obtained by photocuring the composition for support materials. After the model material is made, the support material can be removed by physically peeling it, or dissolving it in an organic solvent or water.

The composition for support materials contains, for example, a water-soluble monofunctional ethylenically unsaturated monomer, and polyalkylene glycol containing an oxyethylene group and/or an oxypropylene group.

<Water-Soluble Monofunctional Ethylenic Unsaturated Monomer>

A water-soluble monofunctional ethylenically unsaturated monomer is a water-soluble polymerizable monomer having one ethylenic double bond in the molecule, which has such property that it is cured with an energy ray. Examples of the water-soluble monofunctional ethylenically unsaturated monomer include hydroxy group-containing (meth)acrylates having 5 to 15 carbon atoms [e.g. hydroxyethyl (meth)acrylate, hydroxypropyl (meth)acrylate, 4-hydroxybutyl (meth)acrylate etc.], alkylene oxide adduct-containing (meth)acrylates having Mn of 200 to 1,000 [e.g. polyethylene glycol mono(meth)acrylate, monoalkoxy(1 to 4 carbon atoms)polyethylene glycol mono(meth)acrylate, polypropylene glycol mono(meth)acrylate, monoalkoxy(1 to 4 carbon atoms)polypropylene glycol mono(meth)acrylate, mono (meth)acrylate of a PEG-PPG block polymer etc.], (meth) acrylamide derivatives having 3 to 15 carbon atoms [e.g. (meth)acrylamide, N-methyl(meth)acrylamide, N-ethyl (meth)acrylamide, N-propyl(meth)acrylamide, N-butyl (meth)acrylamide, N,N'-dimethyl(meth)acrylamide, N,N'-diethyl(meth)acrylamide, N-hydroxyethyl(meth) acrylamide, N-hydroxypropyl(meth)acrylamide, N-hydroxybutyl(meth)acrylamide etc.], (meth)acryloylmorpholine, and the like. These may be used alone, or two or more of them may be used in combination.

From a viewpoint that the curability of the composition for support materials is improved, and a support material obtained by photocuring the composition for support materials is rapidly dissolved in water, the content of the water-soluble monofunctional ethylenically unsaturated monomer is preferably 20 parts by weight or more, and more preferably 25 parts by weight or more, based on 100 parts by weight of the whole composition for support materials. Additionally, the content of the water-soluble monofunctional ethylenically unsaturated monomer is preferably 50 parts by weight or less, and more preferably 45 parts by weight or less, based on 100 parts by weight of the whole composition for support materials. In addition, when two or more of the water-soluble monofunctional ethylenically unsaturated monomers are contained, the content is a total of the contents of respective water-soluble monofunctional ethylenically unsaturated monomers.

<Polyalkylene Glycol Containing Oxyethylene Group and/or Oxypropylene Group>

Polyalkylene glycol containing an oxyethylene group and/or an oxypropylene group is such that at least ethylene oxide and/or propylene oxide are (is) added to an active hydrogen compound. Examples of the polyalkylene glycol include polyethylene glycol, polypropylene glycol, and the like. These may be used alone, or two or more of them may be used in combination. Examples of the active hydrogen compound include monohydric to tetrahydric alcohols, amine compounds, and the like. Among these, a dihydric alcohol or water is preferable.

From a viewpoint that the solubility in water of a support material obtained by photocuring the composition for support materials is enhanced, the content of the polyalkylene glycol is preferably 20 parts by weight or more, and more preferably 25 parts by weight or more, based on 100 parts by weight of the whole composition for support materials. Additionally, the content of the polyalkylene glycol is preferably 49 parts by weight or less, and more preferably 45 parts by weight or less, based on 100 parts by weight of the whole composition for support materials. In addition, two or more of the polyalkylene glycols are contained, the content is a total of the contents of respective polyalkylene glycols.

A number average molecular weight Mn of the polyalkylene glycol is preferably 100 to 5,000. When Mn of the polyalkylene glycol is within the above range, the polyalkylene glycol is compatibilized with the composition for support materials before photocuring, and is not compatibilized with the composition for support materials after photocuring. As a result, independence of a support material obtained by photocuring the composition for support materials can be enhanced, and the solubility of the support material in water can be enhanced. Mn of the polyalkylene glycol is more preferably 200 to 3,000, and further preferably 400 to 2,000.

Another additive can be contained in the composition for support materials as necessary, in such a range that the effect of the present invention is not impaired. Examples of another additive include water-soluble organic solvents, antioxidants, coloring agents, pigment dispersants, preservation stabilizers, ultraviolet absorbing agents, light stabilizers, polymerization inhibitors, chain transfer agents, fillers, and the like.

A method for producing the composition for support materials is not particularly limited. For example, the composition can be produced by uniformly mixing the water-soluble monofunctional ethylenically unsaturated monomer, the polyalkylene glycol, and as necessary, another additive using a mixing stirring device or the like.

From a viewpoint that dischargeability from an inkjet head is improved, it is preferable that the thus produced composition for support materials has a viscosity at 25° C. of 100 mPa·s or less. In addition, measurement of the viscosity of the composition for support materials can be performed using a R100-type viscometer in accordance with JIS Z 8803.

3. Optically Shaped Article and Production Method Thereof

An optically shaped article according to the present embodiment is shaped using the composition for model materials according to the present embodiment. That is, the optically shaped article according to the present embodiment is produced via a step (I) of photocuring the composition for model materials according to the present embodiment to obtain a model material and, at the same time, photocuring the composition for support materials to obtain a support material, by an inkjet optical shaping method, and a step (II) of removing the support material. The step (I) and the step (II) are not particularly limited, but are performed, for example, by the following methods.

<Step (I)>

FIG. 1 is a view schematically showing a step (I) in the method for producing an optically shaped article according to the present embodiment. As shown in FIG. 1, a three-dimensional shaping apparatus 1 comprises an inkjet head module 2 and a shaping table 3. The inkjet head module 2 has an inkjet head for a model material 21, filled with a composition for model materials 4a, an inkjet head for a support material 22, filled with a composition for support materials 5a, a roller 23, and a light source 24.

First, the inkjet head module 2 is made to perform scanning in an X direction and a Y direction relatively to the shaping table 3 in FIG. 1, and at the same time, the composition for model materials 4a is discharged from the inkjet head for model materials 21, and the composition for support materials 5a is discharged from the inkjet head for support materials 22, and thereby, a composition layer composed of the composition for model materials 4a and the composition for support materials 5a is formed. In order to smooth an upper surface of the composition layer, the extra composition for model materials 4a and the extra composition for support materials 5a are removed using the roller 23. These compositions are irradiated with light using the light source 24, and thereby, a cured layer composed of a model material 4 and a support material 5 is formed on the shaping table 3.

Then, the shaping table 3 is lowered in a Z direction in FIG. 1 by the thickness of the cured layer. Thereafter, by the same method as that described above, a cured layer composed of a model material 4 and a support material 5 is further formed on the cured layer. By repeatedly performing these steps, a cured product 6 composed of a model material 4 and a support material 5 is prepared.

Examples of light for curing the composition include far infrared rays, infrared rays, visible rays, near ultraviolet rays, ultraviolet rays, and the like. From a viewpoint of easiness and efficiency of curing work, among them, near ultraviolet rays or ultraviolet rays are preferable.

Examples of the light source 24 include a lamp system, an LED system, and the like. From a viewpoint that facility can be miniaturized and power consumption is small, among these, an LED system is preferable.

<Step (II)>

Figure 2:
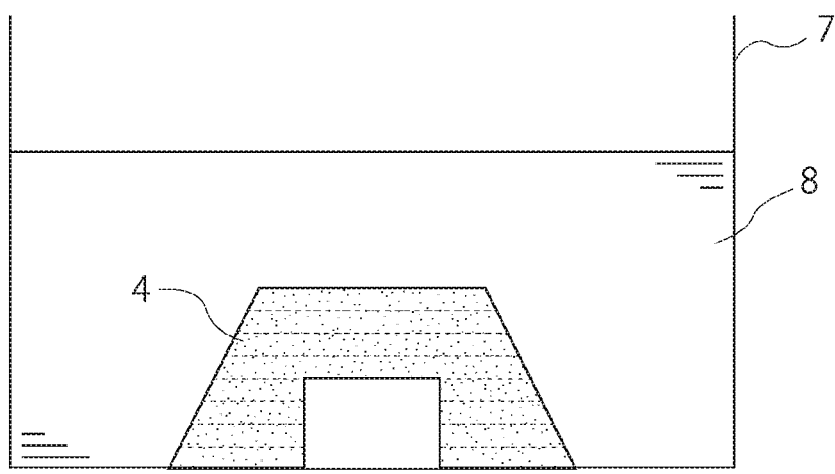
FIG. 2 is a view schematically showing a step (II) in a method for producing an optically shaped article according to the present embodiment.

FIG. 2 is a view schematically showing a step (II) in the method for producing an optically shaped article according to the present embodiment. The cured product 6 composed of the model material 4 and the support material 5, which was prepared in the step (I), is immersed in a solvent 8 contained in a container 7. Thereby, as shown in FIG. 2, the support material 5 can be dissolved in the solvent 8, and removed.

Examples of the solvent 8 for dissolving the support material 5 include ion-exchanged water, distilled water, tap water, well water, and the like. From a viewpoint of relatively small content of impurities and inexpensive availability, among them, ion-exchanged water is preferable.

The optically shaped article according to the present embodiment, which was obtained by the above steps, has flexibility, and does not crack even when it is bent.

Examples more specifically disclosing the present embodiment will be shown below. In addition, the present invention is not limited to only these examples.

Examples

<Composition for Model Materials>
(Production of Composition for Model Materials)
According to formulation shown in Table 1, (A) to (C) components, a photopolymerization initiator, and a preservation stabilizer were uniformly mixed by using a mixing stirring device to produce compositions for model materials of Examples 1 to 9 and Comparative Examples 1 to 5. Using these compositions for model materials, the following assessment was performed.

H-TEMPO: 4-Hydroxy-2,2,6,6-tetramethylpiperidine-N-oxyl [HYDROXY-TEMPO, manufactured by Evonik Degussa Japan Co., Ltd.]

(Measurement of Viscosity)
The viscosity of the compositions for model materials of Examples 1 to 9 and Comparative Examples 1 to 5 was measured under the conditions of 25° C. and a cone rotation number of 5 rpm using a R100-type viscometer (manufactured by TOKI SANGYO CO., LTD.). Measurement results are shown in Table 2.

(Sample Preparation)
A silicone rubber sheet (thickness: 3 mm, manufactured by AS ONE Corporation) was excised into a rectangle of 76 mm×52 mm, thereafter, from a central part of the rectangle, a rectangle of 56 mm×32 mm was cut out, and thereby, a

TABLE 1

| | | | Example 1 | Example 2 | Example 3 | Example 4 | Example 5 | Example 6 | Example 7 | Example 8 | Example 9 | Comparative Example 1 | Comparative Example 2 | Comparative Example 3 | Comparative Example 4 | Comparative Example 5 |
|---|---|---|---|---|---|---|---|---|---|---|---|---|---|---|---|---|
| Formulation (parts by weight) | (A) Monofunctional monomer | PEA | 69.8 | 79.8 | 79.8 | 89.8 | 67.3 | 67.3 | — | 71.8 | 64.8 | 74.8 | 64.8 | 64.8 | 92.2 | 85.7 |
| | | EOEOEA | — | — | — | — | — | — | 69.8 | — | — | — | — | — | — | — |
| | | GEN1122 | — | — | — | — | — | — | — | — | — | — | — | — | 4.4 | 11 |
| | (B) Oligomer | CN996 | 25 | — | — | 5 | 25 | 25 | 25 | 25 | 20 | — | 25 | 25 | —* | —* |
| | | Ebe210 | — | 15 | — | — | — | — | — | — | — | 20 | — | — | —* | —* |
| | | Ebe3708 | — | — | 15 | — | — | — | — | — | — | — | — | — | —* | —* |
| | (C) Polyfunctional monomer | HDDA | — | — | — | — | 2.5 | — | — | — | — | — | 5.0* | — | 1.8 | 1.7 |
| | | TPCDA | — | — | — | — | — | — | — | — | — | — | — | 5.0* | — | — |
| Photopolymerization initiator | | TPO | 5 | 5 | 5 | 5 | 5 | 5 | 5 | 3 | 15 | 5 | 5 | 5 | 1.5 | 1.5 |
| Preservation stabilizer | | H-TEMPO | 0.2 | 0.2 | 0.2 | 0.2 | 0.2 | 0.2 | 0.2 | 0.2 | 0.2 | 0.2 | 0.2 | 0.2 | 0.1 | 0.1 |
| Total molar fraction of hydroxyl group and amino group possessed by (B) component (%) | | | 2.5 | 4.7 | 4.7 | 0.4 | 2.5 | 2.5 | 2.4 | 2.4 | 2.1 | 6.6* | 2.5 | 2.5 | — | — |

* means outside the range defined in claim 1.

PEA: Phenoxyethyl acrylate [SR339 (ethylenic double bond/one molecule: one bond), manufactured by Arkema S.A.]

EOEOEA: Ethoxyethoxyethyl acrylate [SR256 (ethylenic double bond/one molecule: one bond) manufactured by Arkema S.A.]

GEN1122: 2-Acrylic acid, 2-[[(butylamino)carbonyl]oxy]ethyl ester [(ethylenic double bond/one molecule: one bond) manufactured by RAHN AG]

CN996: Urethane acrylate oligomer [CN996 (ethylenic double bond/one molecule: two bonds), Mw=5500, manufactured by Arkema S.A.]

Ebe210: Urethane acrylate oligomer [(ethylenic double bond/one molecule: two bonds), Mw=1500, manufactured by DAICEL ALLNEX LTD.]

Ebe3708: Epoxy acrylate oligomer [EBECRYL3708 (ethylenic double bond/one molecule: two bonds), Mw=1500, manufactured by DAICEL ALLNEX LTD.]

HDDA: 1,6-Hexanediol diacrylate [SR238 (ethylenic double bond/one molecule: two bonds), manufactured by Arkema S.A.]

TPGDA: Tripropylene glycol diacrylate [SR306 (ethylenic double bond/one molecule: two bonds), manufactured by Arkema S.A.]

TPO: 2,4,6-Trimethylbenzoyl-diphenyl-phosphine oxide [DAROCURE TPO, manufactured by BASF SE]

frame of a rectangle was prepared. The frame of a rectangle was stuck on a glass plate of 56 mm×32 mm (S9224, manufactured by Matsunami Glass Ind., Ltd.) by pressure bonding, and thereby, a mold was prepared. Into a frame of the mold was poured 5.5 g of each of the compositions for model materials of Examples 1 to 9 and Comparative Examples 1 to 5, and was irradiated with ultraviolet rays using an ultraviolet ray irradiating apparatus (metal halide Lamp, irradiated light amount: 500 mJ/cm$^2$). Further, after sufficiently cooled to room temperature, a cured product was taken out from the mold, and thereby, samples for assessment of Examples 1 to 9 and Comparative Examples 1 to 5 were prepared. Using the samples for assessment, assessment of the following durometer hardness, bendability, rebound resilience, and surface tackiness was performed.

(Assessment of Durometer Hardness)
The durometer hardness of the samples for assessment of Examples 1 to 9 and Comparative Examples 1 to 5 was measured using a type A durometer in accordance with JIS K7215. Measurement results are shown in Table 2. When the durometer hardness is too low, since a cured product becomes too soft, it becomes easy to crack. Hence, it is preferable that the durometer hardness is 20 or more.

(Assessment of Bendability)
Each of the samples for assessment of Examples 1 to 9 and Comparative Examples 1 to 5 was wound on a round bar of φ 5 mm. The bendability was assessed according to the following assessment criteria.

Assessment results are shown in Table 2.

○: When the sample was wound, a crack was not generated.

x: When the sample was wound, a crack was generated.

(Assessment of Rebound Resilience)

Five samples for assessment of each of Examples 1 to 9 and Comparative Examples 1 to 5 were overlapped, a glass marble was fallen thereon from 30 cm above, and a rebound amount of the glass marble was observed visually. The rebound resilience was assessed according to the following criteria. Assessment results are shown in Table 2.

○: The glass marble rebounds well.

Δ: The glass marble rebounds.

x: The glass marble rebounds little.

(Assessment of Surface Tackiness)

A finger was pushed against each of samples for assessment of Examples 1 to 9 and Comparative Examples 1 to 5, and the surface tackiness was assessed according to the following criteria. Assessment results are shown in Table 2.

◎: There is no tacky feeling, and even when a finger is pushed thereagainst, a fingerprint trace remains little.

○: There is almost no tacky feeling, and when a finger is pushed thereagainst, a fingerprint trace remains slightly.

Δ: There is a slight tacky feeling, and when a finger is pushed thereagainst, a fingerprint trace remains.

x: There is a tacky feeling, and when a finger is pushed thereagainst, a finger trace remains.

(Assessment of Elongation Rate)

Based on JIS K 6251, each of the compositions for model materials of Examples 1 to 9 and Comparative Examples 1 to 5 was used to optically shape a dumbbell No. 3 shape having the thickness of about 1 mm, and a test was performed with a tensile testing machine at a tension speed of 500 mm/min. The optical shaping was performed under the conditions of light source: LED (wavelength 385 nm), illuminance: about 600 mW/cm$^2$, lamination thickness: 32 μm, and lamination times: 32 times. In addition, upon the optical shaping, a composition for support materials was not used. Upon a tensile test, the elongation rate was calculated from change in the gauge length. Calculation results are shown in Table 2. When the elongation rate is small, upon bending of a cured product, it becomes easy to crack. For that reason, the elongation rate of 150 or more was determined to be accepted.

(Assessment of Breaking Stress)

Upon the tensile test in the assessment of the elongation rate, a stress at break was measured, and was used as a breaking stress. Measurement results are shown in Table 2. When a breaking stress is small, a cured product does not have the sufficient rebound resilience. For that reason, a breaking stress of 3.0 or more was determined to be accepted.

As seen from results of Table 2, in compositions for model materials of Examples 1 to 9 satisfying all of the requirements of the present invention and cured products thereof, all of the viscosity, the durometer hardness, the bendability, the rebound resilience, the surface tackiness, the elongation rate, and the breaking stress were good. That is, cured products of the compositions for model materials of Examples 1 to 9 have flexibility, and do not crack even when they are bent.

In the composition for model materials of Comparative Examples 1 and a cured product thereof since a total molar fraction of a hydroxyl group or an amino group possessed by the (B) component exceeds 5.0%, the bendability was inferior.

In the compositions for model materials of Comparative Examples 2 and 3 and cured products thereof, since the content of the (C) component exceeds 3.0 parts by weight, the bendability and the elongation rate were inferior.

In the compositions for model materials of Comparative Examples 4 and 5 and cured products thereof, since the (B) component is not contained, the rebound resilience, the surface tackiness, and the breaking stress were inferior.

INDUSTRIAL APPLICABILITY

By photocuring the composition for model materials of the present invention, an optically shaped article that has flexibility and does not crack even when it is bent can be obtained. Accordingly, the composition for model materials of the present invention can be suitably used in producing an optically shaped article by an inkjet optical shaping method.

The invention claimed is:

1. A composition for model materials, which is used for shaping an optically shaped article by an inkjet optical shaping method,
    comprising a monofunctional monomer (A) and an oligomer (B) as a photocurable component,
    further, comprising no polyfunctional monomer (C) as a photocurable component, or comprising a polyfunctional monomer (C) as a photocurable component at 3.0 parts by weight or less based on 100 parts by weight of a whole composition for model materials,
    wherein the oligomer (B) has a weight average molecular weight Mw of 1,000 to 10,000 and has a hydroxyl group or an amino group, and
    a total molar fraction of the hydroxyl group and the amino group in a total amount of the photocurable components is 2.5% or less.

2. The composition for model materials according to claim 1, wherein the oligomer (B) is one or more selected from a urethane (meth)acrylate oligomer, an epoxy (meth)acrylate oligomer, and a polyester (meth)acrylate oligomer.

TABLE 2

| | Example 1 | Example 2 | Example 3 | Example 4 | Example 5 | Example 6 | Example 7 | Example 8 | Example 9 | Comparative Example 1 | Comparative Example 2 | Comparative Example 3 | Comparative Ex ample 4 | Comparative Example 5 |
|---|---|---|---|---|---|---|---|---|---|---|---|---|---|---|
| Viscosity (mPa · s) | 95.7 | 35.1 | 30.1 | 16.2 | 80.6 | 88.0 | 82.6 | 93.1 | 92.5 | 50.7 | 115.2 | 106.8 | 9.2 | 9.9 |
| Durometer hardness A | 53 | 42 | 42 | 33 | 73 | 65 | 30 | 50 | 48 | 52 | 59 | 57 | 41 | 30 |
| Bendability | ○ | ○ | ○ | ○ | ○ | ○ | ○ | ○ | ○ | x | x | x | ○ | ○ |
| Rebound resilience | ○ | ○ | ○ | Δ | ○ | ○ | Δ | ○ | ○ | ○ | ○ | ○ | x | x |
| Surface tackiness | ○ | ○ | ○ | Δ | ◎ | ◎ | Δ | ○ | ○ | Δ | ○ | ○ | x | x |
| Elongation rate (%) | 240 | 260 | 210 | 230 | 150 | 160 | 250 | 230 | 200 | 220 | 120 | 120 | 280 | 310 |
| Breaking stress | 5.4 | 4.6 | 7.2 | 3.5 | 10.4 | 11.8 | 4.9 | 5.1 | 5.0 | 5.1 | 14.2 | 13.5 | 0.9 | 1.2 |

3. The composition for model materials according to claim 1, wherein a content of the monofunctional monomer (A) is 60.0 to 95.0 parts by weight based on 100 parts by weight of the whole composition for model materials.

4. The composition for model materials according to claim 1, wherein a content of the oligomer (B) is 5 to 30 parts by weight based on 100 parts by weight of the whole composition for model materials.

5. An optically shaped article which is shaped by using the composition for model materials as defined in claim 1 by an inkjet optical shaping method.

6. A method for producing an optically shaped article by an inkjet optical shaping method, comprising:
- a step (I) of photocuring the composition for model materials as defined in claim 1 to obtain a model material and, at the same time, photocuring a composition for support materials to obtain a support material, and
- a step (II) of removing the support material.

7. The composition for model materials according to claim 2, wherein a content of the monofunctional monomer (A) is 60.0 to 95.0 parts by weight based on 100 parts by weight of the whole composition for model materials.

8. The composition for model materials according to claim 2, wherein a content of the oligomer (B) is 5 to 30 parts by weight based on 100 parts by weight of the whole composition for model materials.

9. The composition for model materials according to claim 3, wherein a content of the oligomer (B) is 5 to 30 parts by weight based on 100 parts by weight of the whole composition for model materials.

10. The composition for model materials according to claim 1, further comprising a photopolymerization initiator selected from the group consisting of acylphosphine oxide compounds having 22 to 28 carbon atoms.

* * * * *